US010607002B2

(12) United States Patent
Ilaiwi et al.

(10) Patent No.: US 10,607,002 B2
(45) Date of Patent: Mar. 31, 2020

(54) ISOLATING AN APPLICATION RUNNING INSIDE A NATIVE CONTAINER APPLICATION

(71) Applicant: Microsoft Technology Licensing, LLC, Redmond, WA (US)

(72) Inventors: Faisal Khaled Faisal Ilaiwi, Kirkland, WA (US); Bryan Thomas Phelps, Bellevue, WA (US); Yasser Elsayed, Bothell, WA (US); Christoph Rolf Ponath, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/252,012

(22) Filed: Aug. 30, 2016

(65) Prior Publication Data

US 2018/0060567 A1    Mar. 1, 2018

(51) Int. Cl.
*G06F 21/53*    (2013.01)
*G06F 21/62*    (2013.01)
*G06F 9/455*    (2018.01)

(52) U.S. Cl.
CPC .......... *G06F 21/53* (2013.01); *G06F 21/6218* (2013.01); *G06F 9/455* (2013.01); *G06F 2221/033* (2013.01); *G06F 2221/2141* (2013.01)

(58) Field of Classification Search
None
See application file for complete search history.

(56) References Cited

U.S. PATENT DOCUMENTS

| 8,539,073 B1 | 9/2013 | Dayan |
| 8,863,126 B2 | 10/2014 | Poore et al. |
| 8,887,182 B2 | 11/2014 | Low et al. |

(Continued)

FOREIGN PATENT DOCUMENTS

| CN | 103744652 A | 4/2014 |
| WO | 2015088646 A1 | 6/2015 |
| WO | 2015163938 A1 | 10/2015 |

OTHER PUBLICATIONS

Zhouy, et al., "Hybrid User-level Sandboxing of Third-party Android Apps", In Proceedings of the 10th ACM Symposium on Information, Computer and Communications Security, Apr. 14, 2015, 12 pages.

(Continued)

*Primary Examiner* — Benjamin E Lanier
(74) *Attorney, Agent, or Firm* — Workman Nydegger (57) ABSTRACT

Limiting access to native device capabilities. A method includes, at a container application installed at the computing device, the container application configured to execute hosted script based applications, identifying a hosted application to execute. The method further includes, at the container application, obtaining information identifying a limited set of capabilities from among the native device capabilities indicating which of the native device capabilities the hosted application has been granted access to. The method further includes, at the container application, executing the hosted application and enforcing limits on the hosted application such that the hosted application is only able to access the native device capabilities identified in the limited set of capabilities.

20 Claims, 3 Drawing Sheets

(56) References Cited

U.S. PATENT DOCUMENTS

| | | | |
|---|---|---|---|
| 9,043,480 B2 † | 5/2015 | Barton | |
| 9,069,375 B2 | 6/2015 | Padmavilasom | |
| 9,077,770 B2 | 7/2015 | Redpath | |
| 9,294,554 B2 | 3/2016 | Mandel et al. | |
| 9,307,342 B2 | 4/2016 | Sojoodi et al. | |
| 9,391,826 B1 † | 7/2016 | Dayan | |
| 9,654,508 B2 † | 5/2017 | Barton | |
| 2003/0163630 A1* | 8/2003 | Aasheim | G06F 12/0246 711/103 |
| 2009/0241104 A1* | 9/2009 | Amiga | G06F 8/65 717/174 |
| 2009/0254912 A1* | 10/2009 | Roundtree | G06F 8/61 718/102 |
| 2010/0011446 A1 | 1/2010 | Klucher et al. | |
| 2013/0067531 A1* | 3/2013 | Morris | G06F 21/54 726/1 |
| 2014/0095589 A1 | 4/2014 | Johnson | |
| 2014/0173592 A1 | 6/2014 | y Arcas et al. | |
| 2014/0201328 A1 | 7/2014 | Zhao | |
| 2014/0359098 A1* | 12/2014 | Xu | H04L 67/10 709/223 |
| 2014/0366080 A1 | 12/2014 | Gupta et al. | |
| 2017/0302458 A1* | 10/2017 | Berger | H04L 9/3268 |

OTHER PUBLICATIONS

Gill, Steve, "apache/cordova-js", Retrieved on: Jul. 1, 2016 Available at: https://github.com/apache/cordova-js.

\* cited by examiner
† cited by third party

ISOLATING AN APPLICATION RUNNING INSIDE A NATIVE CONTAINER APPLICATION

BACKGROUND

Background and Relevant Art

Computers and computing systems have affected nearly every aspect of modern living. Computers are generally involved in work, recreation, healthcare, transportation, entertainment, household management, etc.

Due to the ubiquitous nature of computer technology, and due to the vast amount of data and resources available at computer systems, attacks on computer systems by nefarious individuals are widespread and common. Some such attacks are accomplished using computer applications installed on a computing system that are configured to gather data, or otherwise invade a users' privacy. For example, compromised computer applications may be configured to access data stored on a storage device, access location hardware such as GPS devices, surreptitiously record a user by accessing a systems camera and/or microphone, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced at a computing device having native device capabilities. A computer implemented method of limiting access to native device capabilities is illustrated. The method includes, at a container application installed at the computing device, the container application configured to execute hosted script based applications, identifying a hosted application to execute. The method further includes, at the container application, obtaining information identifying a limited set of capabilities from among the native device capabilities indicating which of the native device capabilities the hosted application has been granted access to. The method further includes, at the container application, executing the hosted application and enforcing limits on the hosted application such that the hosted application is only able to access the native device capabilities identified in the limited set of capabilities.

This Summary is provided to introduce a selection of concepts in a simplified form that are further described below in the Detailed Description, This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are able to limit functionality of a hosted application, such as a hosted. HTML application hosted in a container application. In particular, the container application has native capabilities associated with it. The native capabilities may be all or some subset of the native capabilities of a device. Such capabilities may include, for example, hardware access and control capabilities. For example, the native application may include the ability to access a file system (and/or particular portions of a file system), the ability to access and control a camera, the ability to access and control a microphone, the ability to access and control location hardware (such as a gps or Wi-Fi or cellular network hardware), the ability to access and control communication hardware (such as wired or wireless network hardware, near field communication hardware, Bluetooth hardware, etc.), etc.

The container application can limit what capabilities, from among the native capabilities controlled by the container application, are provided to hosted applications running inside the native container application. Thus, access to the native capabilities may be controlled only by the hosting container application. The running hosted application cannot access device capabilities the container application is not allowing.

One example of where embodiments may be used is in the PowerApps™ offering available from Microsoft Corporation, of Redmond, Wash. In particular, a native container application may be Player application in PowerApps™. A CordovaApp or Hybrid app in PowerApps™ may be a hosted application.

Figure 1:
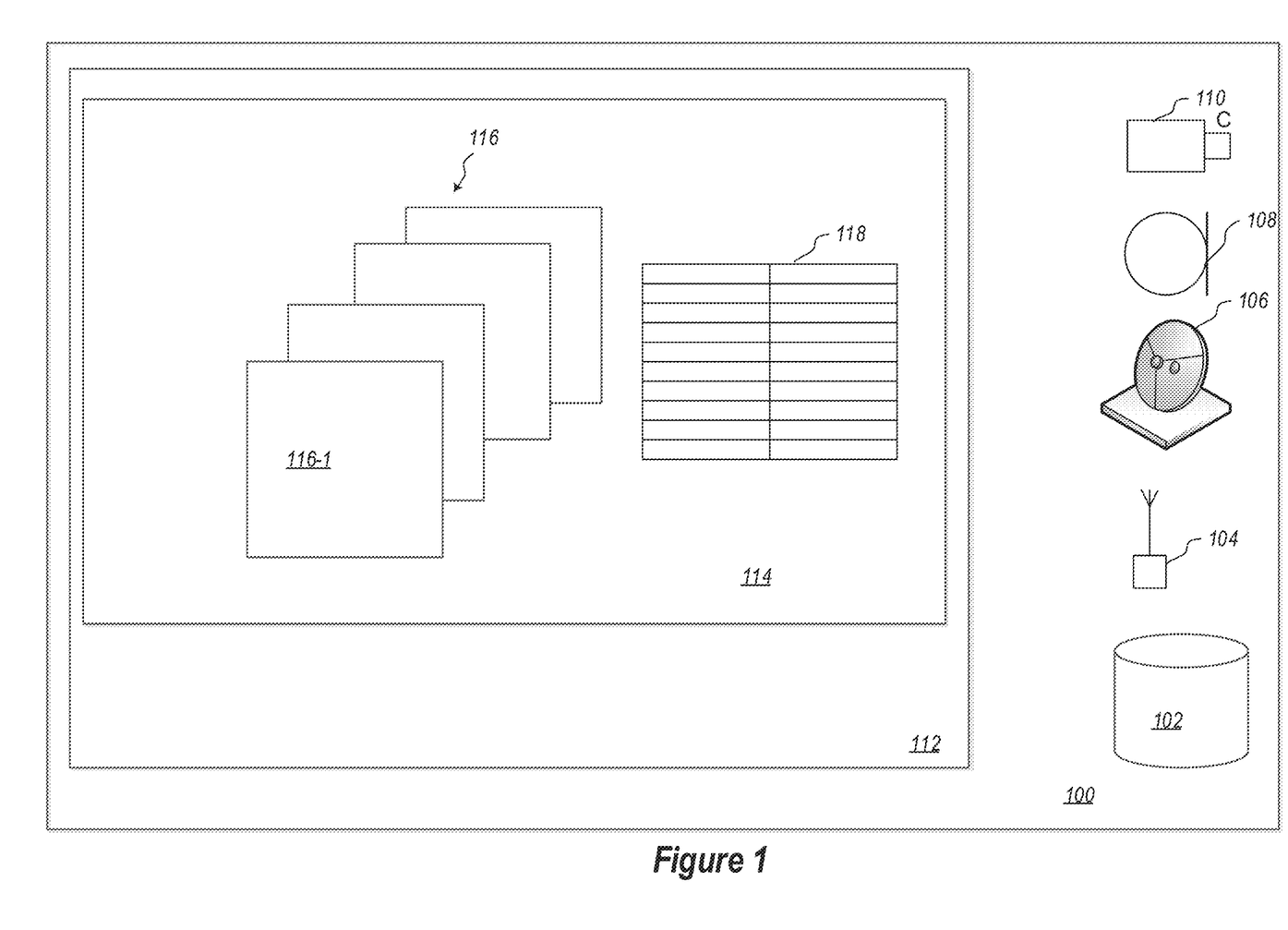
FIG. 1 illustrates a device having a container application and hosted applications executed in the container application.

Referring now to FIG. 1, a device 100 is illustrated. The device may be, for example, a cellular telephone, personal digital assistant, laptop computer, desktop computer, or other computing device. The device 100 includes various hardware components, such as a file system 102, communication hardware 104, location hardware 106, a microphone 108, a camera 110, etc. The device 100 further includes an operating system 112 which controls access to the hardware components. A container application 114 is installed on the device 100. The container application is able to host or run various hosted applications 116. The hosted applications may be, for example, various HTML applications, including applications having JavaScript, where the container application 114 is able to execute the HTML. These hosted applications have access to native device capabilities like the file system 102, communication hardware 104, location hardware 106, the microphone 108, the camera 110, etc. through the hosted application 116 and the operating system 112. The native operating system 112 provides any container application 114 access to those capabilities.

To be able to run hosted applications 116 correctly, embodiments cache the hosted applications 116 locally within the container application. In the default case, without the controls described previously herein and with unfettered access to the native capabilities, this will lead to the hosted applications 116 being able to access each other's data and resources. If malicious code is in one of these hosted applications, this will pose a risk to data stored by or in the other hosted applications. Alternatively or additionally, malicious code in a hosted application may be able to access device sensors, such as the camera 110, the microphone 108, and/or the location hardware 106.

However, embodiments illustrated herein can prevent such unfettered access by limiting hosted applications' access to certain capabilities. For example, a hosted application's access to the native file system 102 and device sensors can be limited by a central portal 118. In particular, the central portal 118 includes information about hosted applications 116. For example, the central portal 118 may include an identification of a hosted application correlated with what access to native capabilities is granted by the container application 114. Thus, control of capabilities may be controlled at the container application 114 level. Each hosted application will be limited to only be able to access those capabilities allowed by the container application 114 through the central portal 118.

In some embodiments, the container application 114 may limit file access to only certain permitted files in the file system 102. The container application may limit hardware access to devices, such as the camera 110, the microphone 108, the location hardware 106, the communication hardware 104, etc.

Note that the limitations on capabilities to hosted applications 116 enforced by the central portal 118 may be enforced to accomplish various different goals and in some embodiments may be dynamically enforced to accomplish such goals.

For example, in some embodiments, it may be desirable to provide a hosted application 116-1 with all of the capabilities it needs to implement all of the functionality of the hosted application 116-1. For example, the hosted application 116-1 may be a camera application with programmatic functionality for taking still photographs, video, automatically uploading photos and video to a network location, and geotagging functionality. The container application 114 may enable all of the functionality to be realized by granting access to the camera 110, the microphone 108, the location hardware 106 and the communication hardware 104, along with access to certain portions of the file system 102.

However, in an alternative embodiment, there may be a desire to limit the functionality of the hosted application 116-1. In particular, it may be desirable to only allow for still photos to be taken by the hosted application 116-1. Therefore, the container application may indicate in the central portal 118 that the hosted application is only able to access the camera 110 and portions of the file system 102. Even though the hosted application 116-1 may include other functionality, the container application 114 could limit that functionality at the container application level.

The container application 114 may be used to implement and enforce enterprise policies, parental controls, hosted application deactivation, hosted application subscription expirations and renewals, thwarting device attacks by preventing some or all hosted applications from using any capabilities, etc. In alternative or additional embodiments, the container application 114 can be used to protect users from unintentional bugs or defects, for example, to prevent an app from unintentionally deleting files from the device. Additionally or alternatively, the user may have confidence that a particular application is only using authorized resources.

Note that the container application 114 may control access to device capabilities dynamically. For example, a correlation of hosted application to permitted capabilities at the central portal 118 may be changed over time. This will change the ability of hosted applications 116 to access various device capabilities.

For example, in some embodiments, the hosted application 114 may revoke access capabilities (or grant additional access capabilities) for one or more hosted applications.

In some embodiments, revoking access to capabilities may be performed in response to an attempt to uninstall (or alternatively a successful uninstall of) a hosted application. For example, a user of the device 100 may attempt to uninstall the hosted application 116-1. This may cause the container application 114 to indicate in the central portal 118 that the hosted application 116-1 should not be correlated with any device capabilities. If the hosted application 116-1 is re-installed, then the hosted application 116-1 can be re-correlated with the appropriate device capabilities at the central portal 118.

In some embodiments, attempting to uninstall the hosted application 116-1 may not be successful or may only be partially successful. This can occur because of an error, because the hosted application 116-1 intentionally resists uninstallation to allow the hosted application 116-1 to continue to perform nefarious activities, or for other reasons. However, in some embodiments, simply attempting to uninstall the hosted application 116-1 will result in the container application limiting some or all access to device capabilities for the hosted application 116-1. Thus, the hosted application 116-1 is essentially rendered inert, whether all of the application components of the hosted application 116-1 were able to be uninstalled or not.

In some embodiments, revoking access to capabilities may be performed in response to installing a hosted application. For example, it may be known that certain hosted applications are incompatible. Thus, when a new hosted application is installed that is incompatible with an existing hosted application, capabilities of either the new hosted application and/or the existing hosted application may be limited to address the incompatibilities.

In some embodiments, revoking access to capabilities may be performed in response to identifying a hosted application or certain functionality of a hosted application as being nefarious or unwanted. For example, the device 100 may access a virus database identifying infected applications. The virus database may identify the hosted application 116-1 as containing a virus or certain undesired functionality. The container application 114 could, as a result, limit access to some or all device capabilities for the hosted application 116-1. For example, if the hosted application 116-1 is identified as spyware, but has otherwise useful functionality, the container application 114 might prevent the hosted application 116-1 from using the communication hardware 104. However, if the hosted application 116-1 is identified as a harmful application with no sufficiently redeeming traits, the hosted application 116-1 may be completely blocked from using any controlled device capabilities.

In some embodiments, revoking access to capabilities may be performed in response to a system administrator indicating limitations based on enterprise policy, user policy, role policy, etc. For example, in some embodiments, the device 100 may be used in an enterprise. Enterprise policy may be changed by the administrator. The container application 114 could enforce at least a portion of this policy change by changing what device capabilities are exposed to one or more different container applications. Alternatively or additionally, an administrator may indicate a change in policy applied to a particular user entity. The container application 114 could enforce at least a portion of this policy change by changing what device capabilities are exposed to one or more different container applications. Alternatively or additionally, an administrator may indicate a change in policy applied to a particular role. The container application 114 could enforce at least a portion of this policy change by changing what device capabilities are exposed to one or more different container applications.

Figure 2:
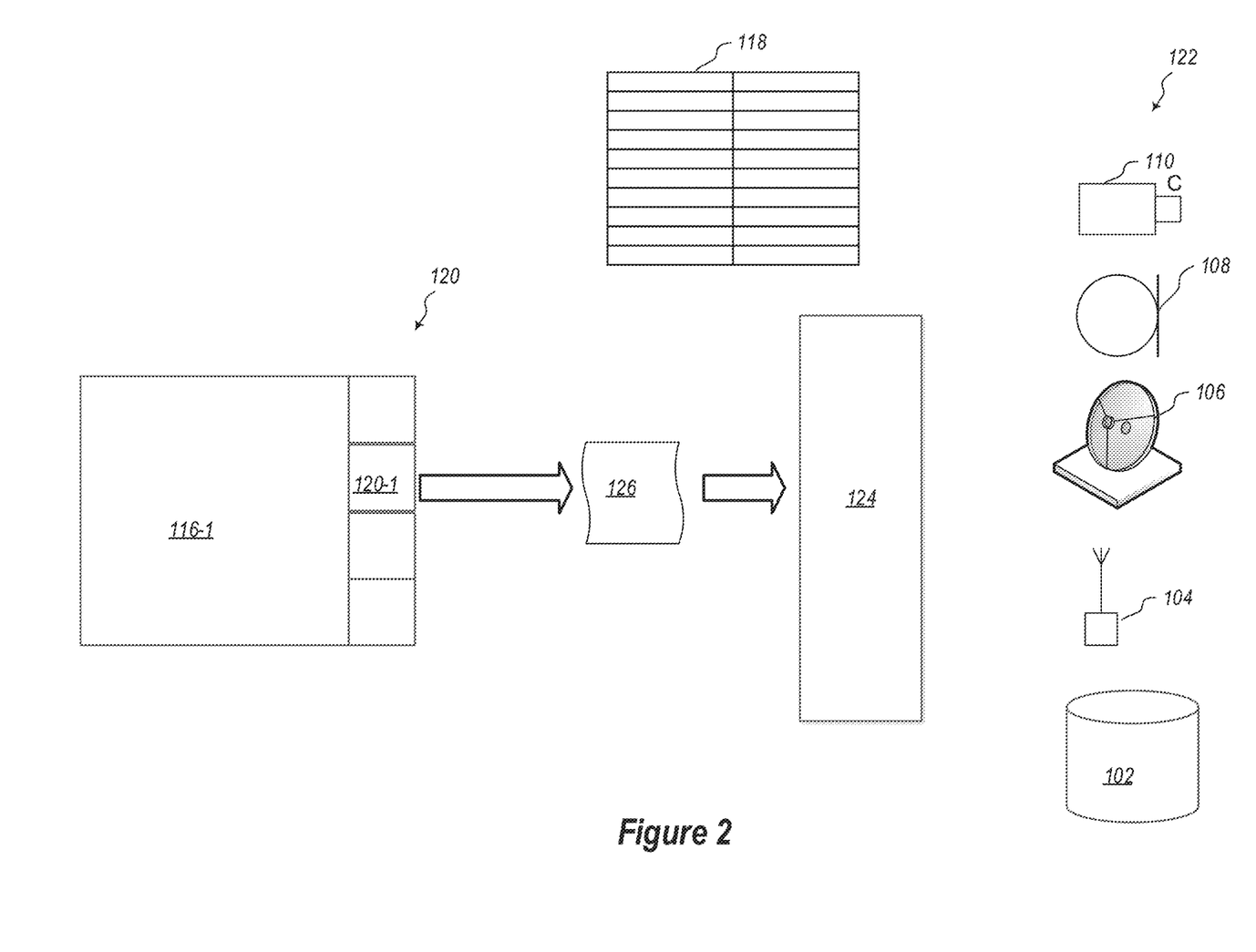
FIG. 2 illustrates an example of a hosted application controlling native device capability access to a hosted application.

Referring now to FIG. 2, an example is illustrated showing how hosted applications access native device capabilities. FIG. 2 illustrates a plugin layer 120. The plugin layer 120 includes various plugins that act as interfaces between a hosted application 116-1 and native device capabilities, such as capabilities associated with system components 122. That is, plugins provide the connection between the two different contexts (native context associated with the container application and hosted application context). In some embodiments, the plugins implement a serialization/transport layer that acts as a bridge between the container application and hosted application. Often, this involves converting or serializing the data—for example, exposing a binary image as a base64 string in javascript. The plugin exposes an API that is consumed by the hosted application. When the hosted application calls this API, the calling context/function call is serialized to the hosted application, where it talks directly to a native device capability (camera, file system, etc.), and then it sends the result back across the bridge. In some embodiments, the plugin could potentially talk to a device driver. However, plugins, in general, are higher-level in that they will use native platform-specific APIs.

Embodiments can obtain each hosted application's information from the central portal 118. This information includes information identifying what device capabilities are permitted to be used by a given hosted application. Thus, before a hosted application 116-1 is run in a container application 114 (see FIG. 1), The container application 114 obtains the information about the hosted application 116-1 from the central portal 118 and uses that information to create hosting manager 124.

The hosting manager 124, therefore, has information about permitted capabilities for the hosted application 116-1, including its locations, what device components it is allowed to access, and portions of the file system 102 the hosted application 116-1 is allowed to access.

Embodiments can add individual plugins to the plugin layer 120 to allow the hosted application 116-1 to communicate with the hosting manager 124 when the hosted application 116-1 requests any operation that needs access to native device capabilities.

For example, consider a case were the hosted application 116-1 needs to write some data to a file in the file system 102. A file plugin 120-1, which provides native file system capabilities for communicating with the file system 102 and particularly with the target file in the file system 102 communicates with the hosting manager 124 by sending a request message 126 from the plugin 120-1 to the hosting manager 124. The hosting manager 124 looks at the request message 126 and decides whether the hosted application 116-1 has access to the file in the file system or not based on information from the central portal 118. If the hosted application 116-1 has access, the operation is permitted by the hosting manager 124. If not, the operation is denied by the hosting manager 124, thus preventing the hosted application 116-1 from requesting device capabilities associated with the operation.

The hosting manager 124 is implemented solely on the native side preventing hosted applications from accessing it or changing it. In some embodiments, the plugins are made up of two parts, one part that resides in the container that contains the hosted app (so the hosted app has access to it), and one part that resides outside of that container. The container that hosts the hosted app prevents the hosted app from having access to any native functionality. The first part of the plugin communicates with the "outside" part of the plugin through messages. The "outside" part verifies permission of the requested functionality, which happens on the native side (i.e., outside of the container) to which the hosted app does not have access.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
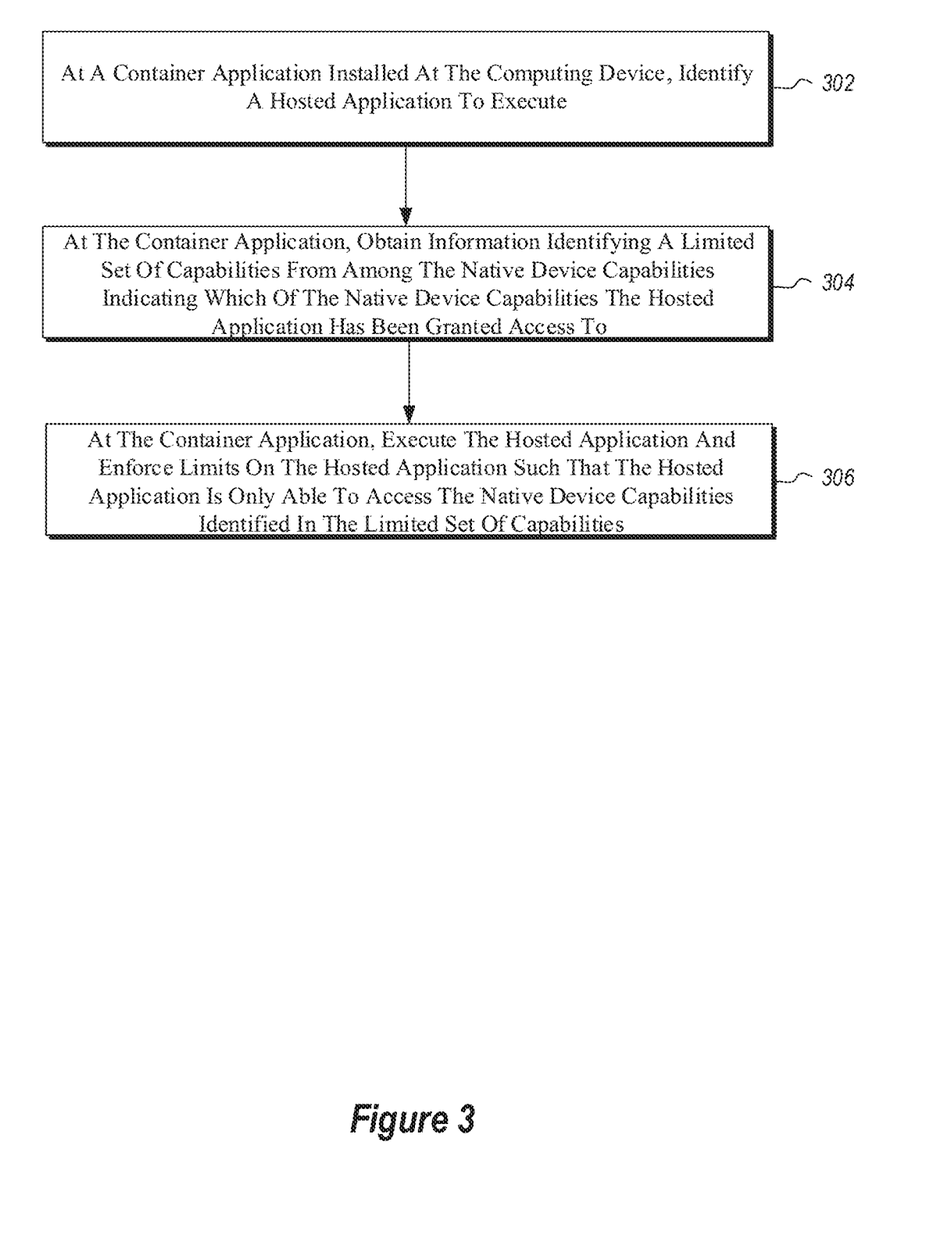
FIG. 3 illustrates a method of limiting access to native device capabilities.

Referring now to FIG. 3, a method 300 is illustrated. The method 300 may be performed at a computing device having native device capabilities. The method 300 is a computer implemented method of limiting access to native device capabilities.

The method 300 includes, at a container application installed at the computing device, identifying a hosted application to execute (act 302). The container application is configured to execute hosted script based applications.

The method 300 further includes, at the container application, obtaining information identifying a limited set of capabilities from among the native device capabilities indicating which of the native device capabilities the hosted application has been granted access to (act 304). For example, while the device may have native capabilities related to a camera, a microphone, communication hardware, location hardware, and a file system, the limited set of capabilities may only include accessing the camera and certain portions of the file system.

The method 300 further includes, at the container application, executing the hosted application and enforcing limits on the hosted application such that the hosted application is only able to access the native device capabilities identified in the limited set of capabilities (act 306). Thus, in the example above, the hosted application may be limited such that it can only access the camera and certain portions of the file system.

The method 300 may be practiced where the hosted application includes functionality configured to use device capabilities for which device capabilities have not been granted to the hosted application and wherein the container application prevents the hosted application from accessing the device capabilities that have not been granted to the hosted application. Thus, in the example above, even though a particular hosted app may include functionality for accessing the microphone, the container app can prevent the hosted app from accessing the microphone.

The method 300 may be practiced where at least one of the capabilities in the set of capabilities comprises a capability for a limited portion of a file system such that the hosted application is limited to accessing only the limited portion of the file system without being able to access other portions of the file system.

The method 300 may be practiced where at least one of the capabilities in the set of capabilities comprises a capability for accessing or controlling device hardware including at least one of a camera, a microphone, communication hardware, or location hardware.

The method 300 may further include revoking access to one or more of the capabilities in the set of capabilities. For example, the method 300 may further include determining that an attempt to uninstall the hosted application has occurred. In this example, revoking access to one or more of the capabilities in the set of capabilities may be performed as a result of determining that an attempt to uninstall the hosted application has occurred. Alternatively or additionally, the method 300 may further include determining that the hosted application is associated with a virus infection. In such embodiments, revoking access to one or more of the capabilities in the set of capabilities may be performed as a result of determining that the hosted application is associated with a virus infection. Alternatively or additionally, the method 300 may further include determining that policy has been changed. In such embodiments, revoking access to one or more of the capabilities in the set of capabilities may be performed as a result of determining that policy has been changed.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer eluding computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable media having stored thereon instructions that are executable by the one or more processors to configure the computer system to limit access to native device capabilities, including instructions that are executable to configure the computer system to perform at least the following:
executing a container application installed at the computer system, the container application configured to execute one or more hosted script based applications and the container application configured to:
identify a hosted application to execute;
obtain information identifying a limited set of capabilities from among the native device capabilities indicating which of the native device capabilities the hosted application has been granted access to;
create a hosting manager, the hosting manager implemented completely within a native context of the device, and provide the information identifying the limited set of capabilities to the hosting manager;
the container application preventing the hosted application from directly accessing any of the native device capabilities;
to provide access to the limited set of capabilities, for the limited set of capabilities, identify and provide plugins which provide access to the limited set of capabilities to the hosted application, the plugins providing a transport layer between the container application and the hosted application which provides a connection between the native context associated with the container application and a hosted application context such that the hosted application can communicate with the limited set of capabilities through the plugins and the hosting manager, each plugin having a container part executing within the container application and an outside part executing within the native context, wherein the container part communicates with the outside part through messages and wherein, before allowing access to any native device capability, the outside part verifies permissions of the hosted application to access the any native device capability; and
execute the hosted application and enforce limits on the hosted application such that the hosted application is able to access only the native device capabilities identified in the limited set of capabilities.

2. The system of claim 1, wherein the hosted application includes functionality configured to use device capabilities for which device capabilities have not been granted to the hosted application and wherein the container application prevents the hosted application from accessing the device capabilities that have not been granted to the hosted application.

3. The system of claim 1, wherein at least one of the capabilities in the set of capabilities comprises a capability for a limited portion of a file system such that the hosted application is limited to accessing only the limited portion of the file system without being able to access other portions of the file system.

4. The system of claim 1, wherein at least one of the capabilities in the set of capabilities comprises a capability for accessing or controlling device hardware including at least one of a camera, a microphone, communication hardware, or location hardware.

5. The system of claim 1, further comprising revoking access to one or more of the capabilities in the set of capabilities.

6. The system of claim 5, wherein the one or more computer-readable media further have stored thereon instructions that are executable by the one or more processors to configure the computer system to determine that an attempt to uninstall the hosted application has occurred, and wherein revoking access to one or more of the capabilities in the set of capabilities is performed as a result of determining that an attempt to uninstall the hosted application has occurred.

7. The system of claim 5, wherein the one or more computer-readable media further have stored thereon instructions that are executable by the one or more processors to configure the computer system to determine that the hosted application is associated with a virus infection, and wherein revoking access to one or more of the capabilities in the set of capabilities is performed as a result of determining that the hosted application is associated with a virus infection.

8. The system of claim 5, wherein the one or more computer-readable media further have stored thereon instructions that are executable by the one or more processors to configure the computer system to determine that policy has been changed, and wherein revoking access to one or more of the capabilities in the set of capabilities is performed as a result of determining that policy has been changed.

9. At a computing device having native device capabilities, a computer implemented method of limiting access to native device capabilities, the method comprising:
executing a container application installed at the computing device, the container application configured to execute one or more hosted script based applications and the container application configured to perform:
identifying a hosted application to execute;
obtaining information identifying a limited set of capabilities from among the native device capabilities indicating which of the native device capabilities the hosted application has been granted access to;
creating a hosting manager, the hosting manager implemented completely within a native context of the device, and providing the information identifying the limited set of capabilities to the hosting manager;
the container application preventing the hosted application from directly accessing any of the native device capabilities;
to provide access to the limited set of capabilities, for the limited set of capabilities, identifying and providing plugins which provide access to the limited set of capabilities to the hosted application, the plugins providing a transport layer between the container application and the hosted application which provides a connection between the native context associated with the container application and a hosted application context such that the hosted application can communicate with the limited set of capabilities through the plugins and the hosting manager, each plugin having a container part executing within the container application and an outside part executing within the native context, wherein the container part communicates with the outside part through messages and wherein, before allowing access to any native device capability, the outside part verifies permissions of the hosted application to access the any native device capability; and executing the hosted application and enforcing limits on the hosted application such that the hosted application is able to access only the native device capabilities identified in the limited set of capabilities.

10. The method of claim 9, wherein the hosted application includes functionality configured to use device capabilities for which device capabilities have not been granted to the hosted application and wherein the container application prevents the hosted application from accessing the device capabilities that have not been granted to the hosted application.

11. The method of claim 9, wherein at least one of the capabilities in the set of capabilities comprises a capability for a limited portion of a file system such that the hosted application is limited to accessing only the limited portion of the file system without being able to access other portions of the file system.

12. The method of claim 9, wherein at least one of the capabilities in the set of capabilities comprises a capability for accessing or controlling device hardware including at least one of a camera, a microphone, communication hardware, or location hardware.

13. The method of claim 9, further comprising revoking access to one or more of the capabilities in the set of capabilities.

14. The method of claim 13, further comprising determining that an attempt to uninstall the hosted application has occurred, and wherein revoking access to one or more of the capabilities in the set of capabilities is performed as a result of determining that an attempt to uninstall the hosted application has occurred.

15. The method of claim 13, further comprising determining that the hosted application is associated with a virus infection, and wherein revoking access to one or more of the capabilities in the set of capabilities is performed as a result of determining that the hosted application is associated with a virus infection.

16. The method of claim 13, further comprising determining that policy has been changed, and wherein revoking access to one or more of the capabilities in the set of capabilities is performed as a result of determining that policy has been changed.

17. A computing device comprising:
one or more cameras;
one or more microphones;
one or more pieces of communication hardware;
one or more pieces of location hardware;
a file system;
a container application coupled to the one or more cameras, one or more microphones, one or more pieces of communication hardware, one or more pieces of location hardware and the file system, wherein the container application is configured to access computing device capabilities associated with the one or more cameras, one or more microphones, one or more pieces of communication hardware, one or more pieces of location hardware and the file system; and a script based hosted application configured to be executed by the container application, wherein the container application is configured to:

create a hosting manager, the hosting manager implemented completely within a native context of the device, and provide information identifying the computing device capabilities to the hosting manager;

the container application preventing the hosted application from directly accessing any of the native device capabilities;

to provide access to the limited set of capabilities, for the computing device capabilities, identify and provide plugins which provide access to the computing device capabilities to the hosted application, the plugins providing a transport layer between the container application and the hosted application which provides a connection between the a native context associated with the container application and a hosted application context such that the hosted application can communicate with the computing device capabilities through the plugins and the hosting manager, each plugin having a container part executing within the container application and an outside part executing within the native context, wherein the container part communicates with the outside part through messages and wherein, before allowing access to any native device capability, the outside part verifies permissions of the hosted application to access the any native device capability; and limit capabilities associated with the one or more cameras, one or more microphones, one or more pieces of communication hardware, one or more pieces of location hardware and the file system to the hosted application even when the hosted application includes functionality for accessing capabilities from which it is limited.

18. The computing device of claim 17, further comprising a central portal coupled to the container application, wherein the central portal comprises a correlation of hosted applications and device capabilities, such that the hosted application is able to identify from the central portal what device capabilities should be granted to hosted applications.

19. The computing device of claim 18, wherein the hosted application is configured to create a hosting manager using the correlation from the central portal, wherein the hosting manager is configured to permit or deny requests from hosted applications.

20. The computing device of claim 17, further comprising a plugin layer configured to allow the hosted applications to access device capabilities.

* * * * *